US012706902B2

(12) United States Patent
Ito

(10) Patent No.: US 12,706,902 B2
(45) Date of Patent: Aug. 11, 2026

(54) ELECTRONIC CONTROL UNIT, MAC TRANSMISSION METHOD, STORAGE MEDIUM, AND ELECTRONIC CONTROL SYSTEM

(71) Applicant: DENSO CORPORATION, Kariya-city (JP)

(72) Inventor: Atsuhiro Ito, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 85 days.

(21) Appl. No.: 18/403,790

(22) Filed: Jan. 4, 2024

(65) Prior Publication Data

US 2024/0244047 A1 Jul. 18, 2024

(30) Foreign Application Priority Data

Jan. 13, 2023 (JP) ................................ 2023-004165

(51) Int. Cl.

| | |
|---|---|
| ***H04L 9/40*** | (2022.01) |
| ***G06F 15/16*** | (2006.01) |
| ***G06F 21/72*** | (2013.01) |
| ***H04L 9/06*** | (2006.01) |
| ***H04L 9/08*** | (2006.01) |
| ***H04L 9/32*** | (2006.01) |
| ***H04L 12/40*** | (2006.01) |
| ***H04L 15/16*** | (2006.01) |

(52) U.S. Cl.
CPC ...... *H04L 63/083* (2013.01); *H04L 12/40032* (2013.01); *H04L 2012/40215* (2013.01); *H04L 2012/40273* (2013.01)

(58) Field of Classification Search
CPC ............ H04L 63/083; H04L 12/40032; H04L 2012/40215; H04L 2012/40273
USPC ............................................................ 726/7
See application file for complete search history.

(56) References Cited

U.S. PATENT DOCUMENTS

2002/0059234 A1* 5/2002 Gumpertz ......... G06F 16/90348
2004/0258081 A1 12/2004 Hayashi
2015/0088495 A1* 3/2015 Jeong .................... H04B 11/00 704/205
2016/0255065 A1 9/2016 Oshida
2017/0195878 A1* 7/2017 Takemori ........... H04L 63/0428
2018/0139072 A1* 5/2018 Komano ................ H04L 12/40
2018/0148006 A1 5/2018 Haga et al.
2018/0183876 A1* 6/2018 Kakiya .............. H04L 61/5007
(Continued)

FOREIGN PATENT DOCUMENTS

CN 106464500 A * 2/2017 .......... H04L 63/123
CN 106464557 * 4/2020 ............ H04L 12/40
(Continued)

*Primary Examiner* — Berhanu Shitayewoldetadik
(74) *Attorney, Agent, or Firm* — Harness, Dickey & Pierce, P.L.C.

(57) ABSTRACT

An electronic control unit is configured to generate a MAC on a basis of transmission data, divide the MAC into a plurality of partial MACs, generate individual identification information items which are information items indicating respective portions of the MAC occupied by the individual partial MACs, store the transmission data in at least one of a plurality of frames and store the individual partial MACs and the individual identification information items corresponding thereto in the plurality of respective fames, and transmit the plurality of frames.

19 Claims, 14 Drawing Sheets

(56) References Cited

U.S. PATENT DOCUMENTS

| | | | | |
|---|---|---|---|---|
| 2018/0219872 | A1 | 8/2018 | Sugashima et al. | |
| 2020/0055470 | A1 | 2/2020 | Haga et al. | |
| 2020/0265853 | A1* | 8/2020 | Hatanaka | H03M 7/6005 |
| 2021/0188201 | A1 | 6/2021 | Haga et al. | |

FOREIGN PATENT DOCUMENTS

| | | | | | |
|---|---|---|---|---|---|
| CN | 106464557 | B | * | 4/2020 | G06F 13/4208 |
| JP | 2005012381 | A | | 1/2005 | |
| JP | 2005269239 | A | | 9/2005 | |
| JP | 2016158204 | A | | 9/2016 | |
| JP | 2017017410 | A | * | 1/2017 | H04L 9/32 |
| JP | 6199335 | B2 | | 9/2017 | |
| JP | 6454917 | B2 | | 1/2019 | |
| JP | 6555209 | B2 | | 8/2019 | |
| JP | 2021-16186 | A | | 2/2021 | |
| WO | WO-2013024587 | A1 | * | 2/2013 | H04L 9/0891 |
| WO | WO-2016006150 | A1 | * | 1/2016 | B60R 16/0231 |
| WO | WO-2018154623 | A1 | * | 8/2018 | H04L 9/3236 |

* cited by examiner

4byte
4byte
Data
MAC

MAC
18
MAC(1)
MAC(2)
MAC(3)
4
8
6
4byte
4byte
①
Data
MAC(1)
8byte
②
MAC(2)
6byte
③
MAC(3)

FIG. 4

| | ID INFO | | | TERM INFO |
|---|---|---|---|---|
| | | | SERVING ALSO AS TERM INFO | |
| ex1 | 0 | 4 | 12 | E |
| ex2 | 1 | 2 | 3 | E |
| ex3 | 3 | 2 | 1 | |
| ex4 | 1 | 2 | 10 | |
| ex5 | 0 | 0 | 3 | |

| DLC | ORDER | DATA SIZE (byte) |
|---|---|---|
| 0 – 8 | 1 | 0 – 8 |
| 9 | 2 | 8 |
| 10 | 3 | 8 |
| 11 | 4 | 8 |
| 12 | 5 | 8 |
| 13 | 6 | 8 |
| 14 | 7 | 8 |
| 15 | 8 | 8 |

FIG. 6C

| DLC | ORDER | DATA SIZE (byte) |
|---|---|---|
| 0 — 8 | 1 | 0 — 8 |
| 9 | 2 | 8 |
| 10 | 3 | 8 |
| 11 | 4 | 8 |
| 12 | 5 | 8 |
| 13 | 6 | 8 |
| 14 | 7 | 8 |
| 15 | LAST | 8 |

FIG. 6D

1byte
0x00
4byte
Data
3byte
MAC (1)
1byte
0x01
7byte
MAC(2)
1byte
0x02
6byte
MAC(3)

1byte
0x00
4byte
Data
3byte
MAC (1)
1byte
0x01
7byte
MAC(2)
1byte
0xFF
6byte
MAC(3)

100
8
Data
4byte
MAC
(1)
4byte
101
8
MAC(2)
8byte
102
15
MAC(3)
6byte 8
0x00
Data
4byte
MAC
3byte
9
0x00
MAC
7byte
10
0xFF
MAC
7byte

FIG. 10

| | DLC | DATA FIELD | CAN ID |
|---|---|---|---|
| 1 | DIV ID | TERM INFO | |
| 2 | DIV ID | | TERM INFO |
| 3 | TERM INFO | DIV ID | |
| 4 | | DIV ID | TERM INFO |
| 5 | TERM INFO | | DIV ID |
| 6 | | TERM INFO | DIV ID |

ELECTRONIC CONTROL UNIT, MAC TRANSMISSION METHOD, STORAGE MEDIUM, AND ELECTRONIC CONTROL SYSTEM

CROSS REFERENCE TO RELATED APPLICATION

This application is based on Japanese Patent Application No. 2023-004165 filed on Jan. 13, 2023, the disclosure of which is incorporated herein by reference.

TECHNICAL FIELD

The present disclosure relates to an electronic control unit, a MAC transmission method, a MAC transmission program, and an electronic control system which are related to transmission of a message authentication code (MAC).

BACKGROUND

A related art discloses an in-vehicle network system including a plurality of ECUs (Electronic Control Units) that control in-vehicle devices, an in-vehicle network for mutual communication between the individual ECUs, such as a CAN (Controller Area Network), and a gateway device that repeats the communication between the ECUs. Each of the ECUs transmits/receives a frame to perform communication.

SUMMARY

The present disclosure describes an electronic control unit that is configured to generate a MAC on a basis of transmission data, divide the MAC into a plurality of partial MACs, generate individual identification information items which are information items indicating respective portions of the MAC occupied by the individual partial MACs, store the transmission data in at least one of a plurality of frames and store the individual partial MACs and the individual identification information items corresponding thereto in the plurality of respective fames, and transmit the plurality of frames.

BRIEF DESCRIPTION OF DRAWINGS

Objects, features and advantages of the present disclosure will become more apparent from the following detailed description made with reference to the accompanying drawings. In the drawings:

FIG. 4 is a diagram illustrating identification information and termination information which are used in each of the embodiments of the present disclosure;

FIG. 6C and FIG. 6D are diagrams illustrating a case where the identification information/termination information in the first embodiment of the present disclosure is assigned to a DLC of a control field;

FIG. 10 is a diagram illustrating combinations when the identification information and the termination information in the first embodiment of the present disclosure is assigned to the other field;

DETAILED DESCRIPTION

Figure 1:
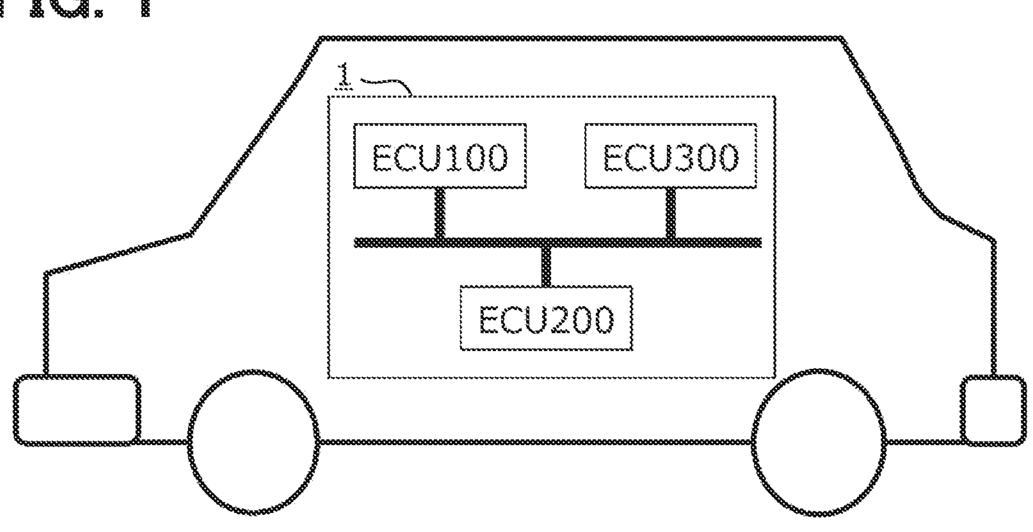
FIG. 1 is a diagram illustrating an electronic control system in each of embodiments of the present disclosure.

In the CAN, there is no security function assuming such a case where an unauthorized frame is transmitted. Accordingly, to prevent interference, hacking, or the like caused by transmission of an unauthorized frame, a message authentication code (MAC) may be added to a data field in the CAN and transmitted. The MAC allows whether or not the frame has been transmitted from the authorized ECU to be identified.

The present inventors have found the following problems. The data field in the CAN may be a 0 to 64-bit region. In other words, the MAC should be kept to a maximum size or length of 64 bits. Actually, the 64-bit region should be shared between data and the MAC and, for example, the data may have 32 bits, while the MAC has 32 bits.

Meanwhile, as the size of the MAC is larger, security provided thereby can ensure greater safety. For example, when a MAC having a size of not less than 10 bytes (80 bits) can be used, greater safety can be ensured. However, since the data field in the CAN originally has a size of 0 to 64 bits, a safer MAC having a size of 10 bytes cannot be stored in the data field. As a result, it has been difficult to sufficiently increase safety. Even in a communication protocol other than the CAN, when a maximum size of a data field is determined, the same problem is encountered.

The present disclosure provides an electronic control unit, a MAC transmission method, a MAC transmission program, and an electronic control system which allow a MAC that can ensure higher safety to be transmitted irrespective of a size or length of a data field in a frame.

According to one aspect of the present disclosure, an electronic control unit comprises: a message authentication code (MAC) generation unit that is configured to generate a MAC on a basis of transmission data; a MAC division unit that is configured to divide the MAC into a plurality of partial MACs; an identification information generation unit that is configured to generate individual identification information items which are information items indicating respective portions of the MAC occupied by the individual partial MACs; a frame generation unit that is configured to store the transmission data in at least one of a plurality of frames and store the individual partial MACs and the individual identification information items corresponding thereto in the plurality of respective fames; and a transmission unit that is configured to transmit the plurality of frames.

A configuration as described above allows a MAC that can ensure higher safety to be transmitted irrespective of a size or length of a data field in a frame.

Referring to the drawings, a description will be given of embodiments of the present disclosure.

Any effects described in embodiments are effects obtained when a configuration of an embodiment is provided as an example of the present disclosure, and are not necessarily effects of the present disclosure.

When there are the plurality of embodiments, the configuration disclosed in each embodiment is not limited to each embodiment alone, and may be combined across the embodiments. For example, the configuration disclosed in one embodiment may be combined with that disclosed in another embodiment. Further, the configurations in the plurality of respective embodiments may be collected and combined with each other.

Configuration as Premise of Embodiments (Electronic Control Unit and Electronic Control System)

Using FIG. 1, an overall configuration of an electronic control system 1 will be described.

The electronic control system 1 includes a plurality of electronic control units (hereinafter abbreviated as ECUs) and an in-vehicle network connecting the ECUs to each other. FIG. 1 illustrates, as an example of the plurality of electronic control units, an example having ECUs 100, 200, and 300. Hereinafter, the ECUs 100, 200, and 300 are simply referred to as the ECUs when the ECUs 100, 200, and 300 are not distinguished from each other.

The ECUs can be configured to include individual ECUs each having any function. Examples of the ECUs include a drive-system electronic control unit that controls an engine, a steering wheel, a brake, and the like, a vehicle-body-system electronic control unit that controls a meter, a power window, and the like, an information-system electronic control unit such as a navigation device, and a safety-control-system electronic control unit that performs control to prevent a collision with an obstacle or a pedestrian.

The ECUs may also be an external communication ECU and an integrated ECU.

The external communication ECU is an ECU that performs communication with the outside. As a communication method to be used by the external communication ECU, any wireless communication method or wired communication method can be used.

The integrated ECU is an ECU having a gateway function of mediating between the individual ECUs and the external communication ECU. Alternatively, it may also be possible to provide the integrated ECU with a function of controlling the entire electronic control system 1, e.g., a security function or a function of managing a security event log of a log management application or the like. The integrated ECU may be referred to also as a gateway ECU (G-ECU) or a mobility computer (MC). The integrated ECU may also be a relaying device or a gateway device.

It may also be possible that the individual ECUs are not parallel, but are categorized into a master and slaves.

The ECUs may be not only physically independent ECUs, but also be virtually implemented virtual ECUs (which may be referred to also as virtual machines).

Examples of the in-vehicle network connecting the individual ECUs include a CAN (Controller Area Network) and a LIN (Local Interconnect Network). A CAN communication protocol has specifications such as those of conventional Classic CAN and CAN FD but, in the present embodiment, the Classic CAN is described by way of example.

In another example, the ECUs may also be connected using any communication method, whether wired or wireless, such as the Ethernet (registered trademark), Wi-Fi (registered trademark), or Bluetooth (registered trademark).

Note that connection refers to a state where data can be exchanged, and includes a case where different hardware items are connected via a wired or wireless communication network as well as a case where virtual machines implemented on the same hardware are virtually connected.

In FIG. 1, an example is illustrated in which the ECUs and the electronic control system 1 including the ECUs are "mounted" in a "moving body". Note that the ECUs and the electronic control system 1 need not necessarily be mounted in the moving body.

It is to be noted herein that the "moving body" refers to a movable object, and a moving speed is optional. Needless to say, a case where the moving body is at a halt is also included. Examples of the moving body include an automobile, a motorcycle, a bicycle, a pedestrian, a vessel, an aircraft, and items mounted thereon, and the moving body is not limited thereto.

"Being mounted" includes not only a case where any item is directly fixed to the moving body, but also a case where the item is not fixed to the moving body, but moves together with the moving body. For example, a case where a person on the moving body possesses the item and a case where the item is loaded on a cargo placed on the mobile body can be listed.

(CAN Frame)

Using FIG. 2, a format of a Classic CAN frame (hereinafter referred to as the CAN frame) is illustrated. The CAN frame includes a SOF (Start Of Frame), an arbitration field, a control field, a data field, and CRC (Cyclic Redundancy Check), ACK (Acknowledgement), and EOF (End Of Frame) fields.

The arbitration field includes an ID and an RTR. The ID is an identifier (ID) including 11 bits and indicating a type of data with a value. The ID is referred to also as the CAN ID.

The control field includes an IDE, a reserved bit r, and DLC. The DLC is a value including 4 bits and indicating a size (bytes) of the data field. In other words, in the case of the Classic CAN, a maximum length of the data field is 8 bytes, and accordingly a value of 0 to 8 can be set to the DLC.

The data field is a region that can be defined by the user, i.e., a field in which details of data to be transmitted are to be stored, and includes a maximum of 64 bits. A size of the data field can be adjusted in units of 8 bits (1 byte).

Figure 2:
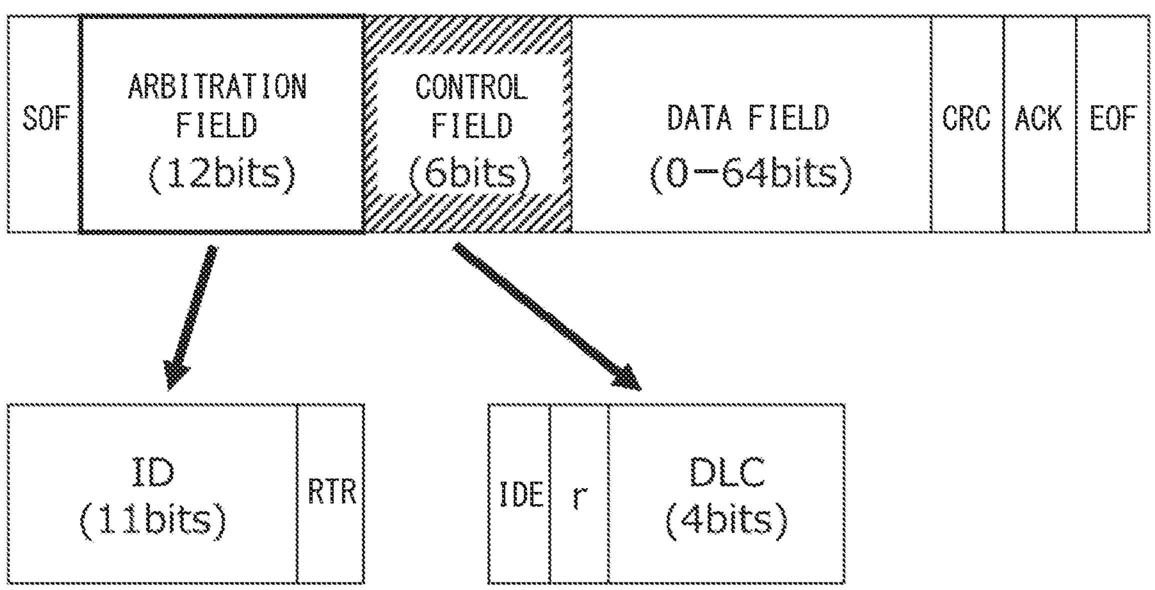
FIG. 2 is a diagram illustrating a configuration of a CAN frame used in each of the embodiments of the present disclosure.

In the drawings including and subsequent to FIG. 2, the arbitration field, the control field, and the data field are respectively indicated by a thick line frame, oblique lines, and a thin line frame, while illustration of the other fields is omitted in the subsequent drawings.

First Embodiment (Electronic Control Unit (ECU))

(Information Related to Main Operation of ECU)

(Division of MAC)

In the present embodiment, the transmission-side ECU divides and stores the MAC in a plurality of the frames and transmits the plurality of frames. Accordingly, using FIG. 3A and FIG. 3B, a description will be given first of the division of the MAC.

Figures 3A, 3B:
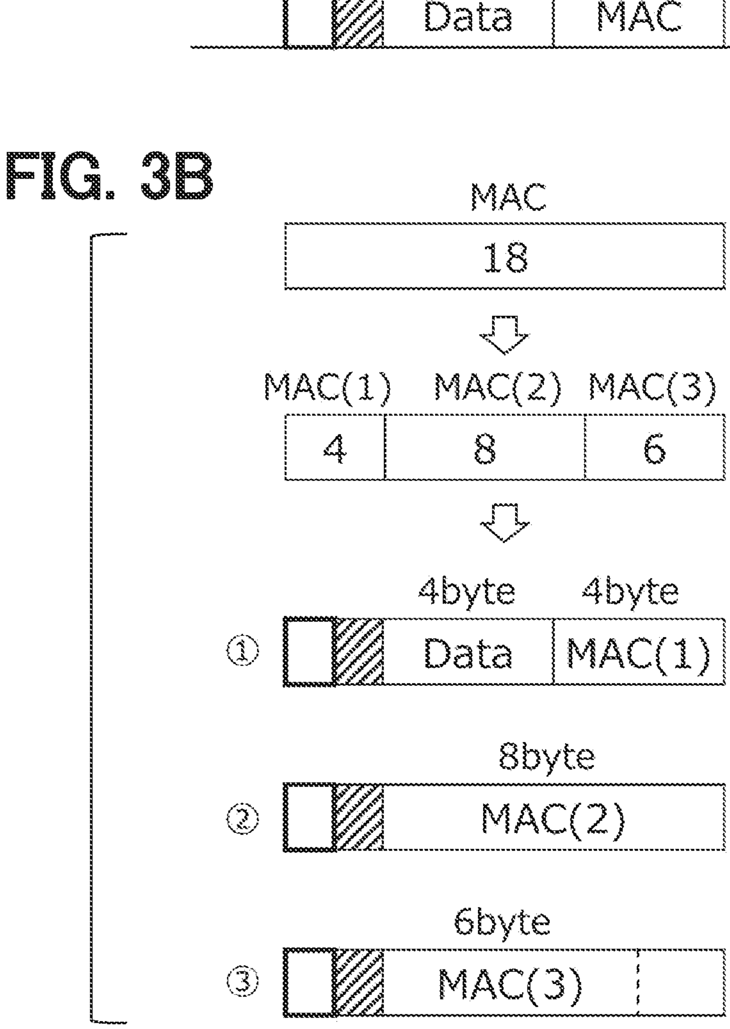
FIG. 3A and FIG. 3B are diagrams illustrating division and storage of a MAC performed in each of the embodiments of the present disclosure.

In a conventional technology, as illustrated in FIG. 3A, in the data field in one frame, transmission data and the MAC are stored. As described previously, the data field of the CAN frame has a maximum of 8 bytes (64 bits), and therefore the 4-byte data and the 4-byte MAC are typically stored in one CAN frame. As a result, in the case of FIG. 3A, the MAC having a size of not less than 4 bytes cannot be stored.

Accordingly, in the present embodiment, as illustrated in FIG. 3B, the MAC having a size of, e.g., 18 bytes is divided into a plurality of partial MACs. At this time, on the basis of the fact that the data field has a maximum of 8 bytes, the MAC is divided into three partial MACs which are MAC (1): 4 bytes, MAC (2): 8 bytes, and MAC (3): 6 bytes.

A division number N is a minimum integral value satisfying the following expression:

$$N > (\text{Transmission Data Size} + MAC\ \text{Size})/8\ \text{bytes}.$$

Subsequently, the 4-byte transmission data and the 4-byte MAC (1) are stored in a first frame, the 8-byte MAC (2) is stored in a second frame, and the 6-byte MAC (3) is stored in a third frame. It may also be possible to perform padding of filling the remaining region of the data field in the third frame with values 0. A set of the plurality of frames in which the transmission data and the plurality of partial MACs obtained by dividing the MAC generated on the basis of the transmission data are to be stored, like these three frames, is referred to as a frame set.

In the example in FIG. 3B, the division is performed such that the sizes of the partial MACs have maximum dimensions that allow the partial MACs to be stored in the frames, i.e., a division number is minimum, but another division method may also be used. For example, it may also be possible to divide the MAC into the partial MACs having sizes as small as, e.g., about 1 byte, and regularly or randomly assign these to the plurality of frames.

Alternatively, it may also be possible to divide even the transmission data and assign the divided transmission data to the plurality of frames.

In FIG. 3B, the division number for the MAC is 3, but the division number may also be set to 2 or 4 or more according to the size of the MAC.

(Identification Information and Termination Information)

(Identification Information)

In the case of restoring the MAC from the partial MACs in the reception-side ECU, the reception-side ECU does not necessarily receive the frames transmitted from the transmission-side ECU in order of transmission and, to restore the MAC, information "indicating respective portions" of the MAC previously occupied by the individual partial MACs is required. In the present embodiment, this information is referred to as identification information.

The identification information may also indicate absolute positions of the partial MACs in the MAC. For example, it is assumed that, as in ex1 in FIG. 4, the MAC (1) beginning at a head portion of the MAC has 0 (bytes), the MAC (2) beginning at the 4-th byte in the MAC has 4 (bytes), and the MAC (3) beginning at the 12-th byte has 12 (bytes).

The identification information may also indicate relative positions of the partial MACs in the MAC. For example, it may also be possible to indicate an "order" of the partial MACs based on a head of the MAC serving as a point of origin. For example, it is assumed that, as in ex2 in FIG. 4, the MAC (1) corresponding to the leading partial MAC in the MAC has 1, the MAC (2) corresponding to the second partial MAC from the leading end has 2, and the MAC (3) corresponding to the third partial MAC from the leading end has 3.

In ex2, the order is shown in ascending order, but may also be in descending order. For example, it is assumed that, as in ex3 in FIG. 4, the MAC (1) corresponding to the third partial MAC from a tail in the MAC has 3, the MAC (2) corresponding to the second partial MAC from the tail in the MAC has 2, and the MAC (3) corresponding to the partial MAC at the tail has 1.

In ex2, the order of the partial MACs is shown in each of the frames, but may also be shown in any thereof. For example, as in ex4 in FIG. 4, it may also be possible to assign the same identification information as in ex2 to the frames except for the final frame.

The "order" mentioned herein may be in either ascending order (count-up) or descending order (count-down).

Figure 4:
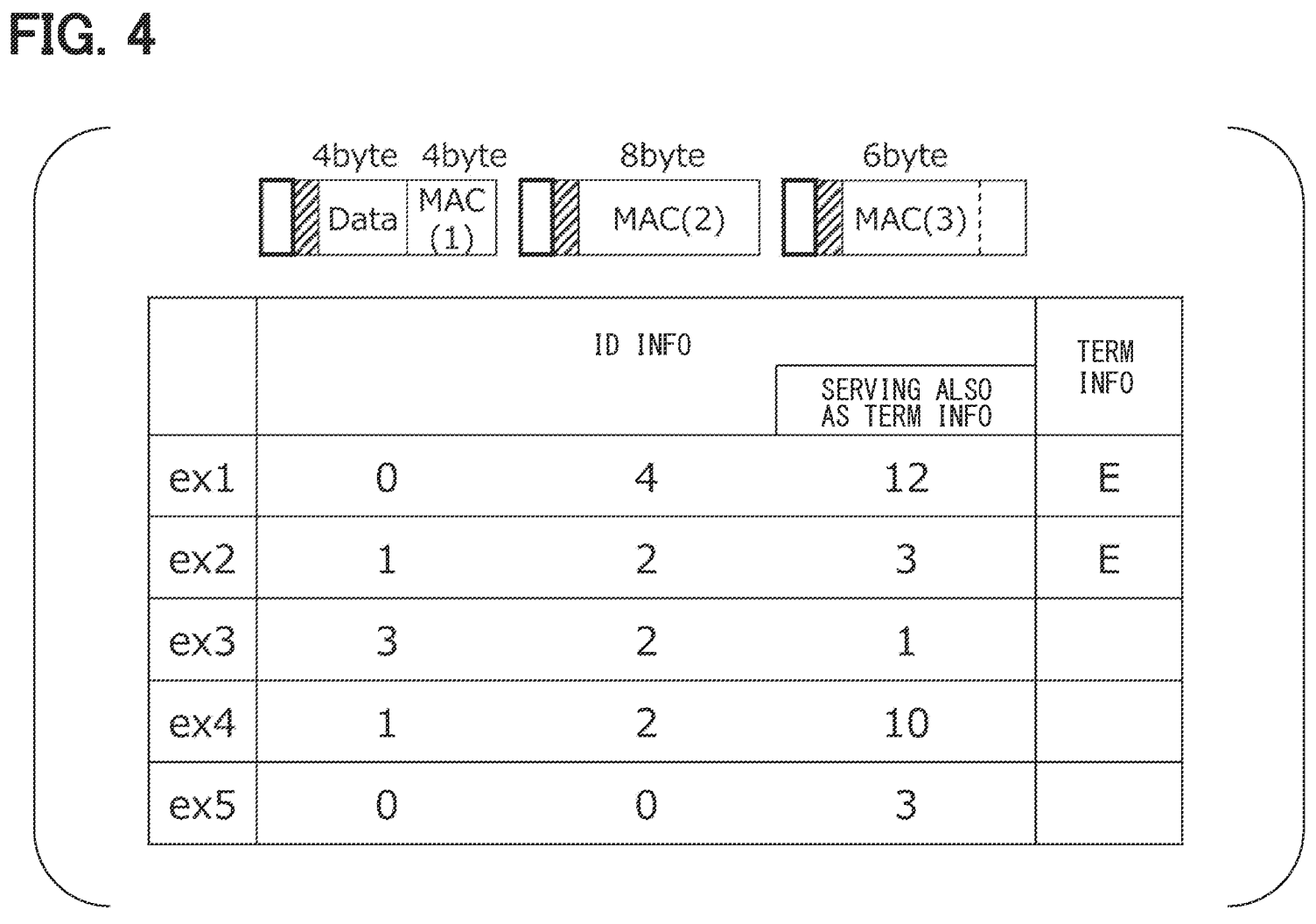

When the sizes of the partial MACs are fixed (e.g., 1 byte) and transmission is sequentially performed from a lower rank to an upper rank and when there is no need to consider switching of the order of the frames on a communication path, as in, e.g., ex5 in FIG. 4, it may also be possible that the MAC (1) has a value of 0 indicating that there is a subsequent partial MAC, the MAC (2) also has a value of 0 indicating that there is a subsequent partial MAC, and the MAC (3) has a value other than 0 indicating that there is no subsequent partial MAC. In ex5, the MAC (3) has 3 corresponding to a total number of the partial MACs. In the case of ex5 also, it can be said that, under the condition that the sizes of the partial MACs are fixed, sequential transmission is performed, and there is no need to consider the switching of the order of the frames, the identification information is information indicating the portions previously occupied by the individual partial MACs.

(Termination Information)

When the reception-side ECU restores the MAC from the partial MACs, the reception-side ECU sequentially receives the frames, and therefore it is desirable that the reception-side ECU can determine whether or not all the partial MACs are received. Accordingly, in the present embodiment, in the last frame in the order of transmission from the transmission-side ECU, information indicating that the order of transmission is last is stored, and the frame is transmitted. In the present embodiment, this information is referred to as termination information.

For example, in FIG. 4, E is stored as the termination information in the MAC (3). In addition, details of the termination information is optional, and it may also be possible that, e.g., bits in a specified region of the frame are represented as the termination information by a flag.

However, it may also be possible that the identification information described above serves also as the termination information. In other words, it may also be possible that the identification information stored in the last frame in the order of transmission from the transmission-side ECU serves also as the termination information indicating that the order of transmission is last.

For example, it may also be possible to use a maximum value among values that can be taken by the identification information as the termination information. For example, when it is assumed in ex4 in FIG. 4 that a maximum value among values that can be taken by the identification information is 10, the value 10 is stored in the last frame in the order of transmission.

Alternatively, when the identification information is in a descending order, it may also be possible to use, as the termination information, a minimum value among the values that can be taken by the identification information. For example, in ex3 in FIG. 4, the value 1 serves as each of the identification information and the termination information.

Still alternatively, as in ex5, it may also be possible to use, as the termination information, a total number of the partial MACs generated by the division.

Yet alternatively, when the MAC has a fixed length and the number of frames in the frame set has a given value, when a division number for the frame is constant, or when it is well known to the reception-side ECU that the order of transmission is last, the corresponding identification information value serves as the termination information. For example, in the case of ex1 or ex2 also, the MAC (3) can serve also as the termination information.

Note that provision of the termination information is optional.

(Configurations of Electronic Control System and Electronic Control Units (ECUs))

Figure 5:
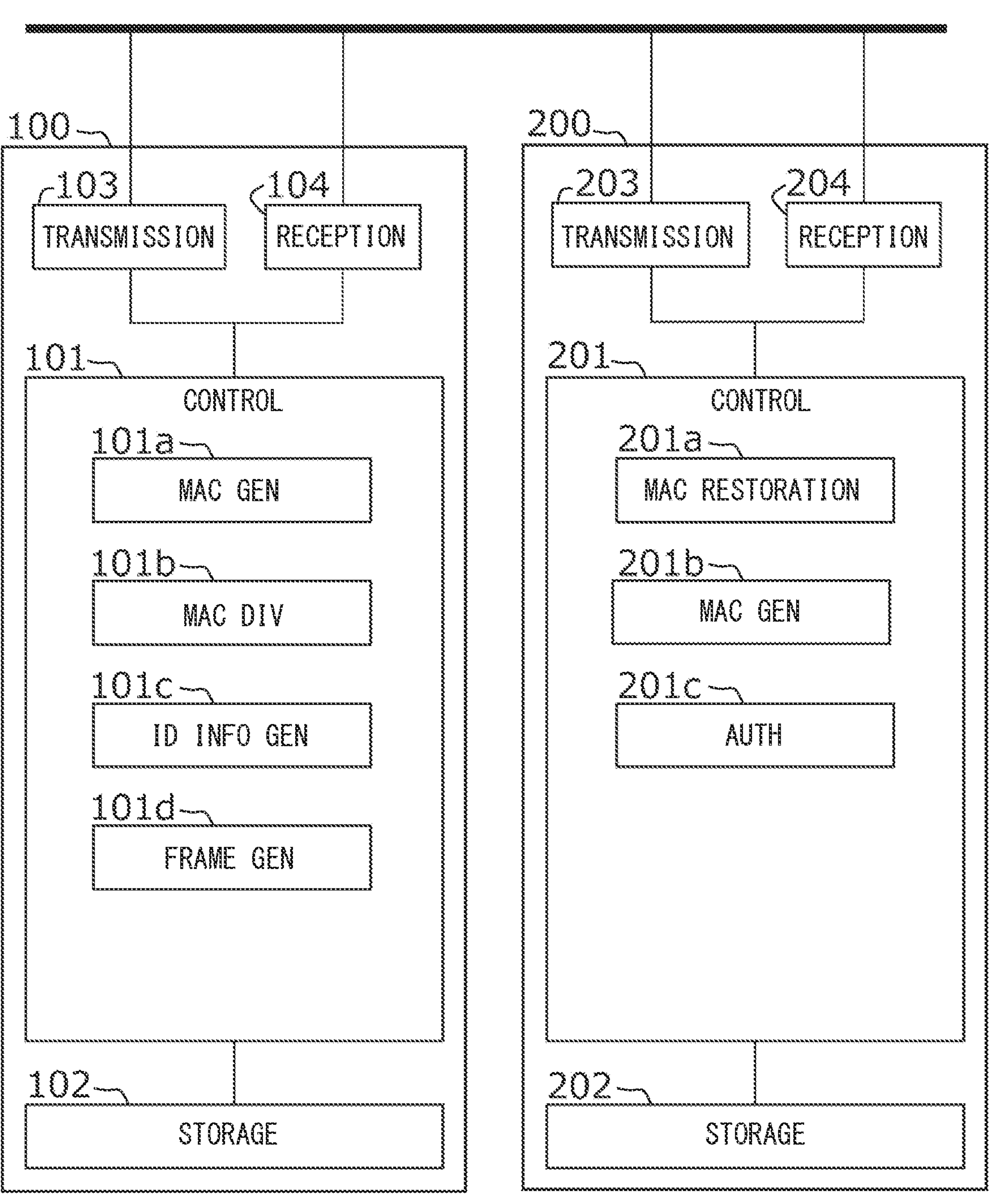
FIG. 5 is a block diagram illustrating an example of configurations of an electronic control system and an electronic control unit included therein in the first embodiment of the present disclosure.

Next, using FIG. 5, a description will be given of configurations of the electronic control system and each of the ECUs included therein in the present embodiment. The description is given herein on the assumption that the ECU 100 is the transmission-side ECU that transmits the frame set, while the ECU 200 is the reception-side ECU that receives the frame set, but each of the ECU 100 and the ECU 200 may also have both of a transmitting function and a receiving function.

The ECU 100 includes the control unit 101, the storage unit 102, the transmission unit 103 and the reception unit 104. The control unit 101 implements a MAC generation unit 101*a*, a MAC division unit 101*b*, an identification information generation unit 101*c*, and a frame generation unit 101*d*.

The MAC generation unit 101*a* generates a message authentication code (MAC) on the basis of the transmission data. The MAC is information for verifying whether or not transmitted/received data has been falsified halfway or the like. The MAC is generated from a common key shared between a transmission side and a reception side and the transmission data. The generated MAC is stored in the storage unit 102.

The MAC division unit 101*b* divides the MAC generated by the MAC generation unit 101*a* into a plurality of portions to generate the plurality of partial MACs. The division of the MAC is exactly as illustrated in FIG. 3B.

The identification information generation unit 101*c* generates individual identification information items, which are the information items "indicating respective portions" previously occupied by the individual partial MACs in the MAC. An outline of the identification information is exactly as already described using FIG. 4. The formats/details of the identification information items may be determined appropriately according to the fields of the frame in which the identification information items are to be stored. Specific examples of the identification information items will be described later in (A) to (D).

Note that the identification information generation unit 101*c* may further generate the termination information.

The "indicating respective portions" mentioned herein may include not only a case where the portions are indicated by absolute positions (ex: leading bit) in the MAC, but also a case where the portions are indicated by relative positions in the MAC which are determined by relative relationships among the individual MACs (ex: an order determined on the basis of the head (or tail) of the MAC serving as the point of origin). Additionally, the "portions" need not necessarily be consecutive portions in the MAC, but may also be indicated by discrete positions.

The frame generation unit 101*d* stores the transmission data in at least one of the plurality of frames, while storing the individual partial MACs and the individual identification information items corresponding thereto in the plurality of respective frames. Specific examples of the fields that store the identification information items will be described later in (A) to (D) along with the specific examples of the identification information.

The frame generation unit 101*d* may further store the termination information indicating that the transmission order is last in the one of the plurality of frames that is last in the order of transmission from the transmission unit 103.

The transmission unit 103 transmits the frame set corresponding to the individual frames generated by the frame generation unit 101*d* to the ECU 200 or to another ECU. The reception unit 104 receives the frames transmitted from the ECU 200 and another ECU and the like.

Next, a description will be given of the ECU 200. The ECU 200 includes the control unit 201, the storage unit 202, the transmission unit 203 and the reception unit 204. The control unit 201 implements a MAC restoration unit 201*a*, a MAC generation unit 201*b*, and an authentication unit 201*c*.

The MAC restoration unit 201*a* uses the individual partial MACs and the individual identification information items which are stored in the plurality of respective frames in the frame set received from the ECU 100 to restore the MAC divided in the ECU 100 and generate a restored MAC (corresponding to a first MAC).

The MAC generation unit 201*b* generates a MAC (corresponding to a second MAC) on the basis of the transmission data stored in at least one of the plurality of frames in the frame set received from the ECU 100. As described above, each of the transmission side and the reception side has the shared key and accordingly, unless the transmission data is falsified, each of the transmission side and the reception side can generate the same MAC.

The authentication unit 201*c* compares the restored MAC restored by the MAC restoration unit 201*a* to the MAC generated by the MAC generation unit 201*b* to authenticate the transmission data. In other words, when the restored MAC and the MAC are compared to each other and are the same, the transmission may be trusted. Meanwhile, when the restored MAC and the MAC are compared to each other and are different, the transmission cannot be trusted.

The transmission unit 203 transmits the frames and the like to the ECU 100 and another ECU.

The reception unit 204 receives the frame set from the ECU 100 and another ECU and the like.

(A) when Identification Information, Etc. Are Stored in Control Field

Using FIG. 6A to FIG. 6D, an example in which the identification information and the termination information are stored in the control field will be described.

In this example, when the frames generated by the frame generation unit 101*d* are based on the Classic CAN communication protocol, the identification information is assigned to a data length code (DLC) to be stored in the control field.

As illustrated in FIG. 2, the control field includes 6 bits, of which 4 bits correspond to the DLC, as illustrated in FIG. 2. The DLC represents a size or length of the data field. Since the data field has a maximum of 8 bytes, the DLC can take numerical values of 0 to 8 Meanwhile, since the DCL includes 4 bits, numerical values of 0 to 15 can be represented. Accordingly, in the DLC, numerical values of 9 to 15 are not used. Therefore, the numerical values in a range of 9 to 15 are utilized as the identification information.

Note that, on the assumption that the plurality of frames are to be transmitted, a data size of the frame to be transmitted first is 8 bytes, and accordingly 8 is assigned to the DLC. Therefore, it can be said that, as the identification information, a numerical value in a range of 8 to 15 is assigned.

Figures 6A, 6B:
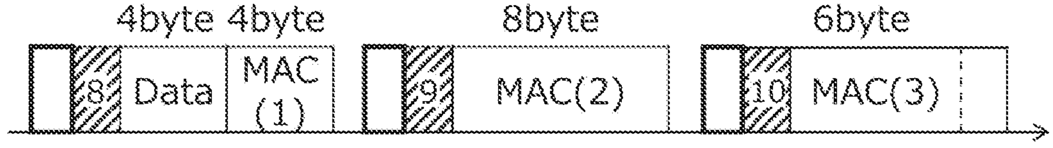
FIG. 6A and FIG. 6B are diagrams illustrating a case where the identification information/termination information in the first embodiment of the present disclosure is assigned to a DLC of a control field.

FIG. 6A illustrates relationships among values of the DLCs, an order of transmission thereof, and data sizes thereof. When the MAC is not divided, the DLCs have values of 0 to 8, and the values correspond to the data sizes. When the MAC is divided, 8 is assigned to the DLC of the frame to be transmitted first. To the DLC of the frame to be transmitted second, 9 is assigned, and the data size is 8 bytes. Thereafter, the value increases to 10 and 11 in the order of transmission, and cases up to a case where the MAC is divided into 8 portions can be handled.

FIG. 6B illustrates a case where the MAC is divided into 3 portions and transmitted. In FIG. 6B, the size of the MAC is 18 bytes, and accordingly the 4-byte transmission data and the 4-byte MAC (1) are stored in the first frame, the 8-byte MAC (2) is stored in the second frame, and the 6-byte MAC (3) and the 2-byte padding are stored in the third frame. Then, the individual frames are transmitted in this order.

In this case, according to the rule illustrated in FIG. 6A, in the first frame, the size of the data field is 8 bytes, and accordingly 8 is assigned to the DLC as usual.

In the second fame, the size of the data field is 8 bytes, but 9 is assigned to the DLC, instead of assigning 8 thereto as usual. In the third fame, the size of the data field is 8 bytes, but 10 is assigned to the DLC, instead of assigning 8 thereto as usual.

Figures 6C, 6D:
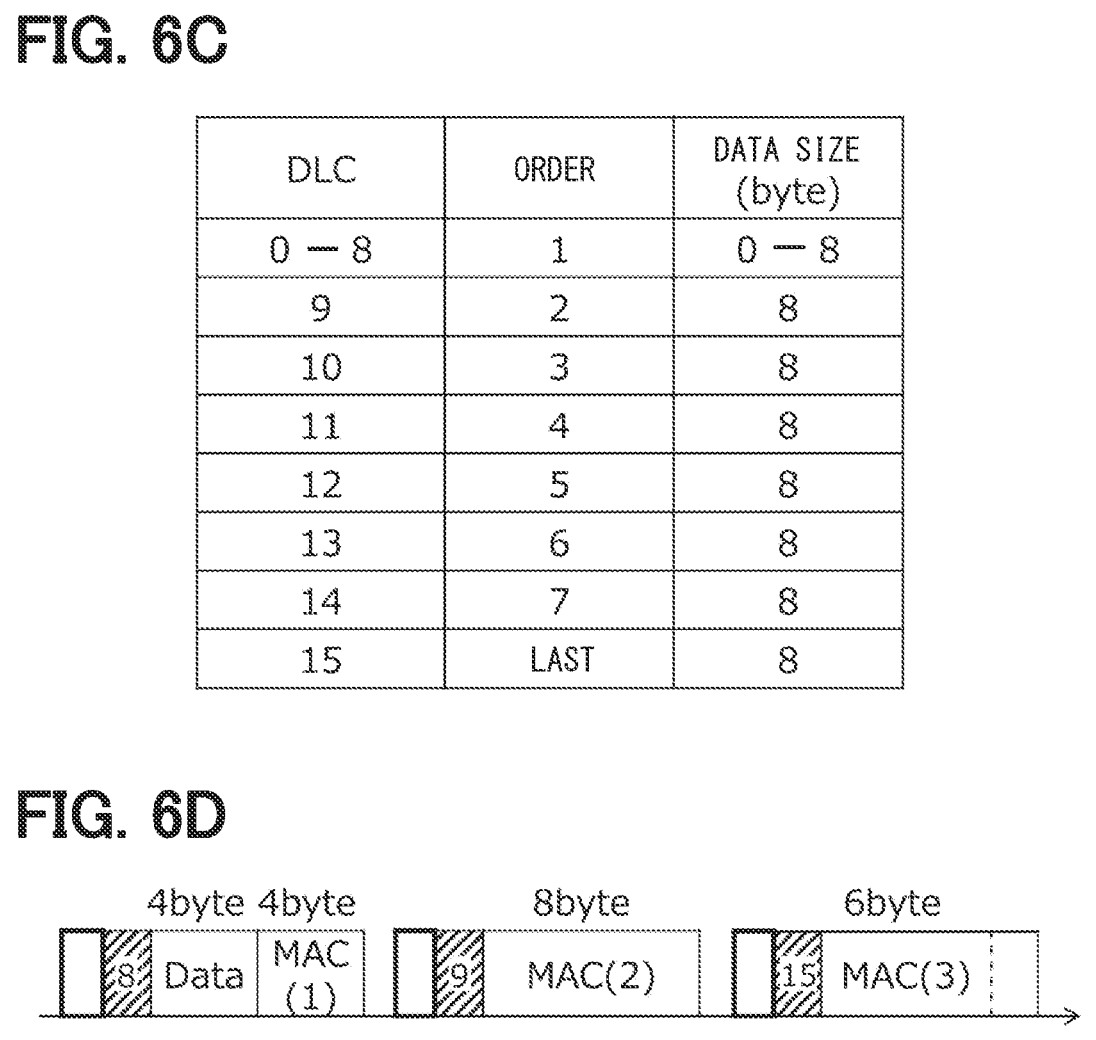

FIG. 6C illustrates another example of the relationships among the values of the DLCs, the order of transmission thereof, and the data sizes thereof. A difference from FIG. 6A is that, when the DLC is 15, the frame to be transmitted last is indicated thereby. In other words, when the DLC is 15 which is a maximum value, the DLC which is 15 functions also as the termination information.

In this case, according to the rule illustrated in FIG. 6C, as illustrated in FIG. 6D, the third fame is a frame to be transmitted last, and therefore 15 is assigned to the DLC.

According to this example, a range which has not been used as the DLC is assigned to the identification information and the termination information, and consequently it is possible to store the identification information and the termination information in the frame. In other words, it is possible to transmit and receive the partial MAC without squeezing the data field.

(B) When Identification Information, Etc. Are Stored in Data Field

Using FIG. 7A and FIG. 7B, an example in which the identification information and the termination information are stored in the data field will be described.

In this example, when the frame generated by the frame generation unit 101*d* is based on the Classic CAN communication protocol, the data field has a maximum of 8 bytes, and accordingly, e.g., 1 byte thereof is assigned to the identification information.

Figures 7A, 7B:
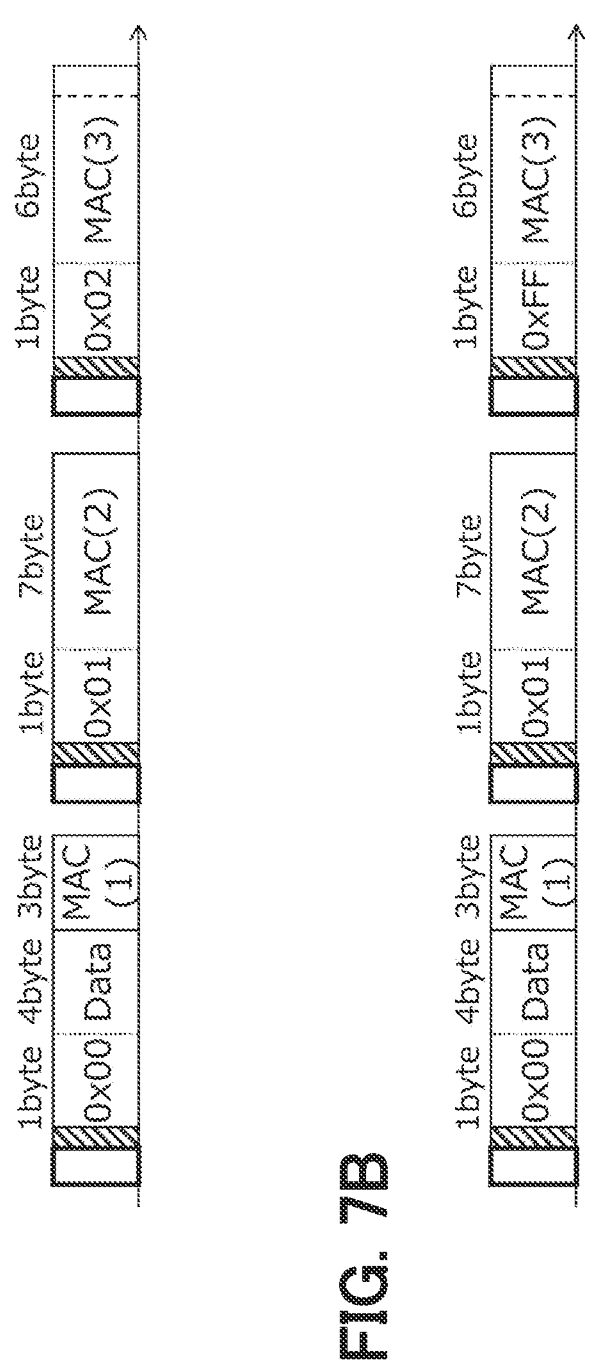
FIG. 7A and FIG. 7B are diagrams illustrating a case where the identification information/termination information in the first embodiment of the present disclosure is stored in a data field.

FIG. 7A illustrates a case where the MAC is divided into 3 portions and transmitted. In FIG. 7A, the size of the MAC is 16 bytes, and accordingly the 4-byte transmission data and the 3-byte MAC (1) are stored in the first frame, the 7-byte MAC (2) is stored in the second frame, and the 6-byte MAC (3) is stored in the third frame. Then, the individual frames are transmitted in this order.

In the case of FIG. 7A, in the data field of the first frame, 0x00 is stored as the identification information. In the data field of the second frame, 0x01 is stored as the identification information. In the data field of the third frame, 0x02 is stored as the identification information. Thus, it is possible to identify whether or not the divided MAC is stored in each of the frames and the position occupied by each frame in the frame set. Note that the size of the identification information when the identification information is to be stored in the data field may also be other than 1 byte. For example, the size of the identification information may also be 2 to 4 bits.

FIG. 7B illustrates another example. A difference from FIG. 7A is that, in the data field of the third frame, 0xFF is stored as the identification information. In other words, when the identification information is 0xFF which is a maximum value, the identification information which is 0xFF functions also as the termination information.

According to this example, the identification information and the termination information are stored in the data field and consequently, even in a case where the size of the MAC is large, i.e., where the division number of the MAC is large, the case can be handled. This example is also useful in a case where the size of the data field is large or where such a communication protocol that the data field has a variable length, e.g., the Ethernet (registered trademark) is used.

(C) When Identification Information, Etc. Are Stored in Arbitration Field

Using FIG. 8A and FIG. 8B, an example in which the identification information and the termination information are stored in the arbitration field will be described.

In this example, when the frame generated by the frame generation unit 101*d* is based on the Classic CAN communication protocol, the identification information is "assigned to" the CAN ID (11 bytes) stored in the arbitration field.

The "assigned to" mentioned herein may include not only a case where the very identification information is assigned to the ID, but also a case where the identification information is assigned together with information having original significance of the ID.

The CAN ID is an identifier including 11 bits and indicating a type of data to be transmitted/received. In other words, by preliminarily defining the corresponding CAN ID on the basis of a type of the data in the data field to be transmitted/received, it is possible to identify the type of the data stored in the data field on the basis of the CAN ID. In this example, the identification information is assigned to the CAN ID. For example, the identification information may also be assigned to a 11-bit CAN ID which is out of use. Alternatively, the identification information may also be assigned to out-of-use lower bits of the in-use CAN ID.

Figures 8A, 8B:
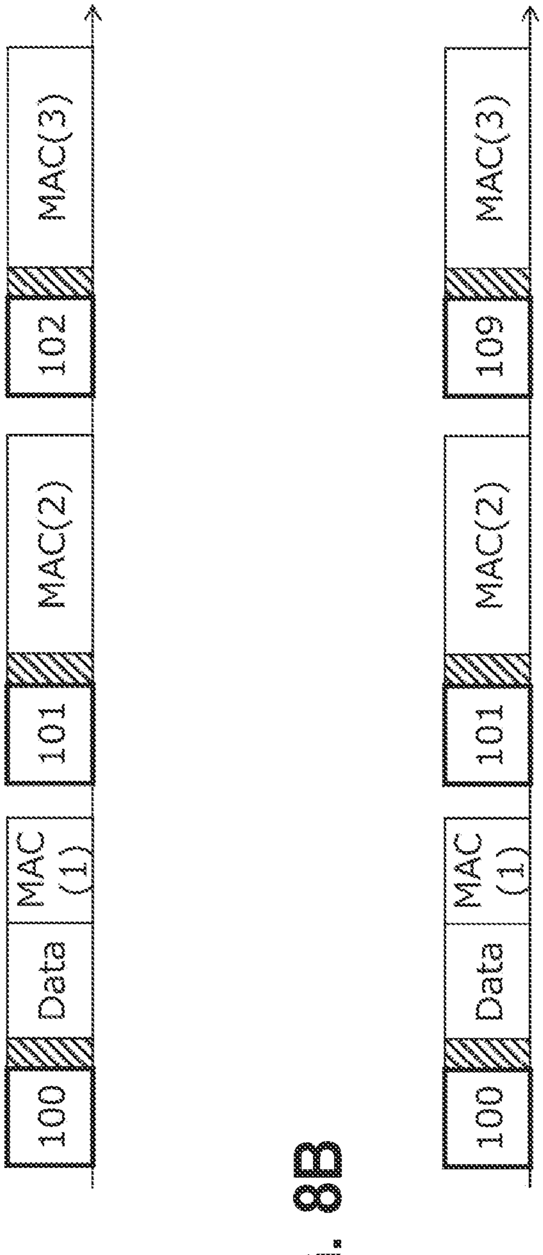
FIG. 8A and FIG. 8B are diagrams illustrating a case where the identification information/termination information in the first embodiment of the present disclosure is assigned to a CAN ID in an arbitration field.

In the case of FIG. 8A, 100 is assigned as the identification information to the lower bits of the CAN ID of the first frame, 101 is assigned as the identification information to the lower bits of the CAN ID of the second frame, and 102 is assigned as the identification information to the lower bits of the CAN ID of the third frame.

FIG. 8B illustrates another example. A difference from FIG. 8A is that 109 is assigned as the identification information to the lower bits of the CAN ID of the third frame. In other words, when the identification information is 109 which is a maximum value, the identification information which is 109 functions also as the termination information.

According to this example, a range which has not been used as the CAN ID is assigned to the identification information and the termination information, and consequently it is possible to store the identification information and the termination information in the frame. In other words, it is possible to transmit and receive the partial MAC without squeezing the data field.

(D) When Identification Information and Termination Information are Stored in Different Fields Using FIG. 9A and FIG. 9B, a description will be given of an example in which the identification information and the termination information are stored in different fields.

Figures 9A, 9B:
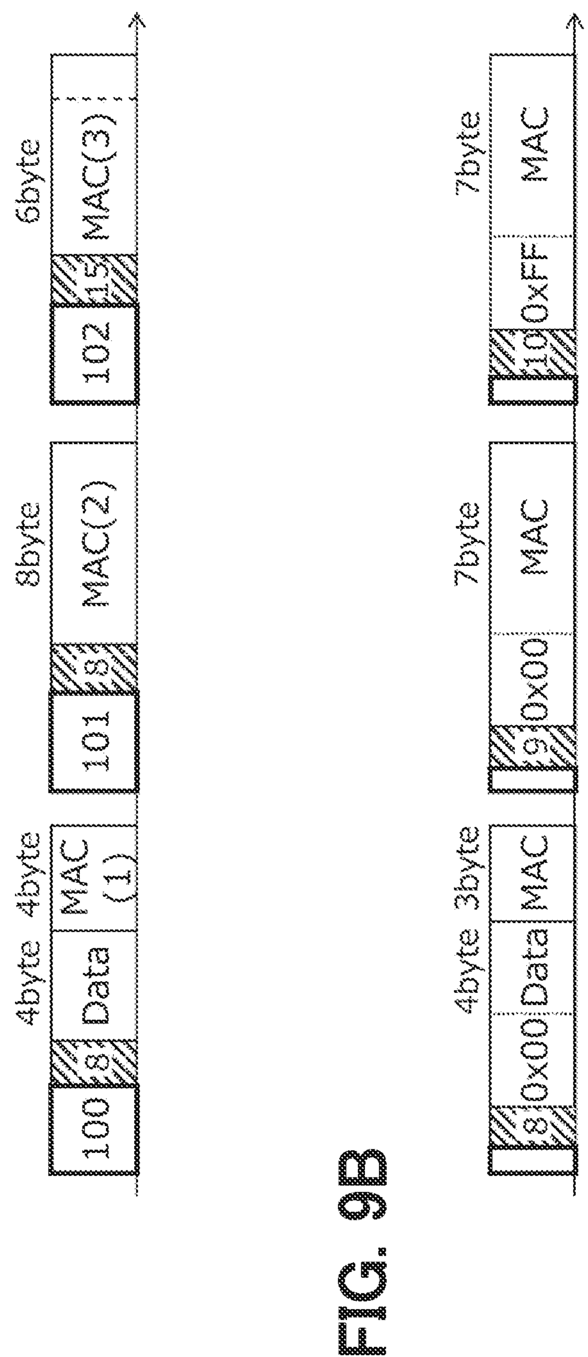
FIG. 9A and FIG. 9B are diagrams illustrating a case where the identification information and the termination information in the first embodiment of the present disclosure is assigned to another field.

FIG. 9A illustrates an example in which the identification information is assigned to the CAN ID of the arbitration field, while the termination information is assigned to the DLC of the control field.

In the case of FIG. 9A, 100 is assigned as the identification information to the lower bits of the CAN ID of the first frame, 101 is assigned as the identification information to the lower bits of the CAN ID of the second frame, and 102 is assigned as the identification information to the lower bits of the CAN ID of the third frame.

Additionally, in the first frame, the data field has a size of 8 bytes, and accordingly 8 is assigned to the DLC. In the second frame, the data field has a size of 8 bytes, and accordingly 8 is assigned to the DLC. The third fame is a frame to be transmitted last, and therefore 15 is assigned to the DLC. To the second frame, 9 is not assigned since it is not necessary to provide the DLC with a function of the identification information.

Note that, when it is not necessary to provide the DLC with the function of the identification information, the DLC only takes values in the range of 0 to 8, and therefore a value of not less than 9 may also be used as the termination information.

FIG. 9B illustrates an example in which the identification information is assigned to the DLC of the control field, while the termination information is stored in the data field.

In the case of FIG. 9B, in the first frame, 8 is assigned as the identification information to the DLC. In the second frame, 9 is assigned as the identification information to the DLC. In the third frame, 10 is assigned as the identification information to the DLC.

In the data field of the first frame, 0x00 is stored as the identification information. In the data field of the second frame, 0x00 is stored as the identification information. In the data field of the third frame, 0xFF is stored as the identification information. In the data field of the first frame and the data field of second frame, 0x01 and 0x02 are not stored since it is not necessary to provide each of the data fields with the function of the identification information.

Combinations when the identification information and the termination information are stored in different fields are not limited to those in FIG. 9A and FIG. 9B, and combinations as illustrated in FIG. 10 can be considered. In other words, it is appropriate to cause any one of the DLC of the control field and the CAN IDs of the data field and the arbitration field to function as the identification information and cause one of the other two to function as the termination information.

(Operation of Electronic Control Unit (ECU))

Using the flow charts in FIG. 11A, FIG. 11B, and FIG. 12, a description will be given of operations of the ECU 100 and the ECU 200 in the present embodiment.

Note that the following operations show not only a MAC transmission method to be implemented in the ECU 100, but also a procedure of processing a MAC transmission program that can be executed in the ECU 100. In addition, the following operations show not only a MAC reception method to be implemented in the ECU 200, but also a procedure of processing of a MAC reception program that can be executed in the ECU 200. Note that such processing is not limited to the orders illustrated in FIG. 11A, FIG. 11B, and FIG. 12. In other words, the orders may also be switched unless there is a restriction such as the presence of a relationship in which a given step uses a result of the preceding step.

In the transmission-side ECU 100, the MAC generation unit 101*a* generates a message authentication code (MAC) on the basis of the transmission data (S1).

The MAC division unit 101*b* calculates a total size of the transmission data and the MAC generated in S1 (S2). In the case of FIG. 3B, the transmission data has 4 bytes and the MAC has 18 bytes, and accordingly the total size is 22 bytes.

Subsequently, the division number for the frames is calculated from the total size, and the MAC is divided (S3) to generate the plurality of partial MACs (S3). In the case of FIG. 3B, the total size is 22 bytes and a maximum size of the data field of one of the frames is 8 bytes, and accordingly the MAC is divided into three frames on the basis of the following expression:

$$N>(\text{Size of Transmission Data+MAC Size})/8\text{ bytes.}$$

The identification information generation unit 101*c* generates, in the MAC generated in S1, the individual identification information items which are information items indicating the respective portions occupied by the individual partial MACs generated in S3 (S4). In addition, the identification information generation unit 101*c* generates the termination information items as necessary (S4).

The frame generation unit 101*d* stores the transmission data in at least one of the plurality of frames, while storing the individual partial MACs generated in S3 and the individual identification information items and termination information items which are generated in S4 in the plurality of respective frames, to generate the plurality of frames (S5). Note that frame generation of the frames may also be performed during any of transmission data generation, partial MAC generation, and identification information generation. Alternatively, the information may also be stored during the generation of each of the information items.

The transmission unit 103 transmits the plurality of frames in the frame set generated in S5 to the ECU 200 or to another ECU.

Note that, in the frame generation in S5 and the frame transmission in S6, the plurality of frames are collectively generated and transmitted, but it may also be possible to repeat the generation and transmission of each one of the frames.

In the reception-side ECU 200, the reception unit 204 receives the plurality of frames in the frame set transmitted from the ECU 100 in S6 (S11).

The MAC restoration unit 201*a* uses the individual partial MACs and the individual identification information items and termination information items, which are stored in the plurality of respective frames received in S11, to generate the restored MAC (corresponding to the "first MAC") (S12). Using FIG. 12, S12 will be described later in detail.

The MAC restoration unit 201*a* determines whether or not a connection end flag is ON (S13). When the connection end flag is ON (S13: YES), the MAC restoration unit 201*a* moves the processing to S14. When the connection end flag is OFF (S13: No), the MAC restoration unit 201*a* ends the processing. The connection end flag is a flag indicating whether or not the restoration of the MAC is completed, and a description will be given of a generation method with FIG. 12.

The MAC generation unit 201*b* generates a MAC (corresponding to the "second MAC") on the basis of the transmission data stored in at least one of the plurality of frames received in S11 (S13).

The authentication unit 201*c* compares the restored MAC restored in S12 to the MAC generated in S13 to authenticate the transmission data (S14).

Next, referring to FIG. 12, a detailed description will be given of the generation of the restored MAC (S12). In this example, it is assumed that the identification information starts with 0 and ends with an integer E indicating the identification information serving also as the termination information.

First, it is determined for the received frames whether or not the identification information indicates the first frame (S21). In FIG. 12, it is assumed that, when the identification information is 0, the identification information indicates the first frame. When the identification information indicates the first frame (S21: YES), a buffer provided in the storage unit 202 is cleared (S22), and the transmission data and/or the partial MACs are stored from the frames received in S11 into the buffer (S23). Then, the identification information (0) is used as the connection end identification information (S24).

When the identification information of the received frames does not indicate the first frame (S21: NO), it is determined whether or not a number obtained by adding 1 to the connection end identification information matches a number of the identification information of the frames received this time (S25). When there is a match (S25: YES), the partial MACs are stored from the received frames into the buffer, and connected to the partial MACs already stored in the buffer (S26). Then, the identification information is used as the connection end identification information (S27).

It is determined whether or not the connection end information is the integer E indicating the termination information of the MAC (S28). When the connection end information is the integer E, i.e., it is indicated that the transmission order is last (S28: YES), the connection end flag is turned ON (S29). When the connection end information is not the integer E, i.e., it is indicated that the transmission order is not last (S28: NO), the connection end flag is turned OFF (S30).

Note that when there is no match in S25 (S25: NO), it may be possible that transmission/reception is not performed appropriately, and therefore the received partial MACs are discarded (S31), and the connection end flag is turned OFF (S32).

Note that, when the reception-side ECU does not support the restoration of the partials MAC, it is appropriate to use only the transmission data and the first frame including the partial MAC to perform MAC authentication. This will be described in the third embodiment.

While the configuration example and the operation example in the present embodiment have been described heretofore on the basis of the case where the CAN is used as the communication protocol, the communication protocol is not limited to the CAN, and the present embodiment may also be applied to another communication protocol.

Thus, according to the present embodiment, it is possible to transmit the MAC that can more reliably ensure safety irrespective of the size or length of the data field of each of the frames.

In addition, according to the present embodiment, even when the reception-side ECU that does not support the restoration of the partial MACs and performs the MAC authentication only with any of the partial MACs is connected in the in-vehicle network, the reception-side ECU can operate. In other words, upward compatibility is provided with devices that perform the MAC authentication only with any of the partial MACs.

Second Embodiment

In the first embodiment, when the MAC is divided to generate the plurality of partial MACs in the ECU 100, all the partial MACs are transmitted from the transmission unit 103. In the present embodiment, when dividing the MAC to generate the plurality of partial MACs, the ECU 100 determines whether or not to transmit all of the partial MACs, and transmits any of the partial MACs or all of the partial MACs. The following will describe only parts different from those in the first embodiment and cite the description in the first embodiment for the same parts as those in the first embodiment.

Figure 13:
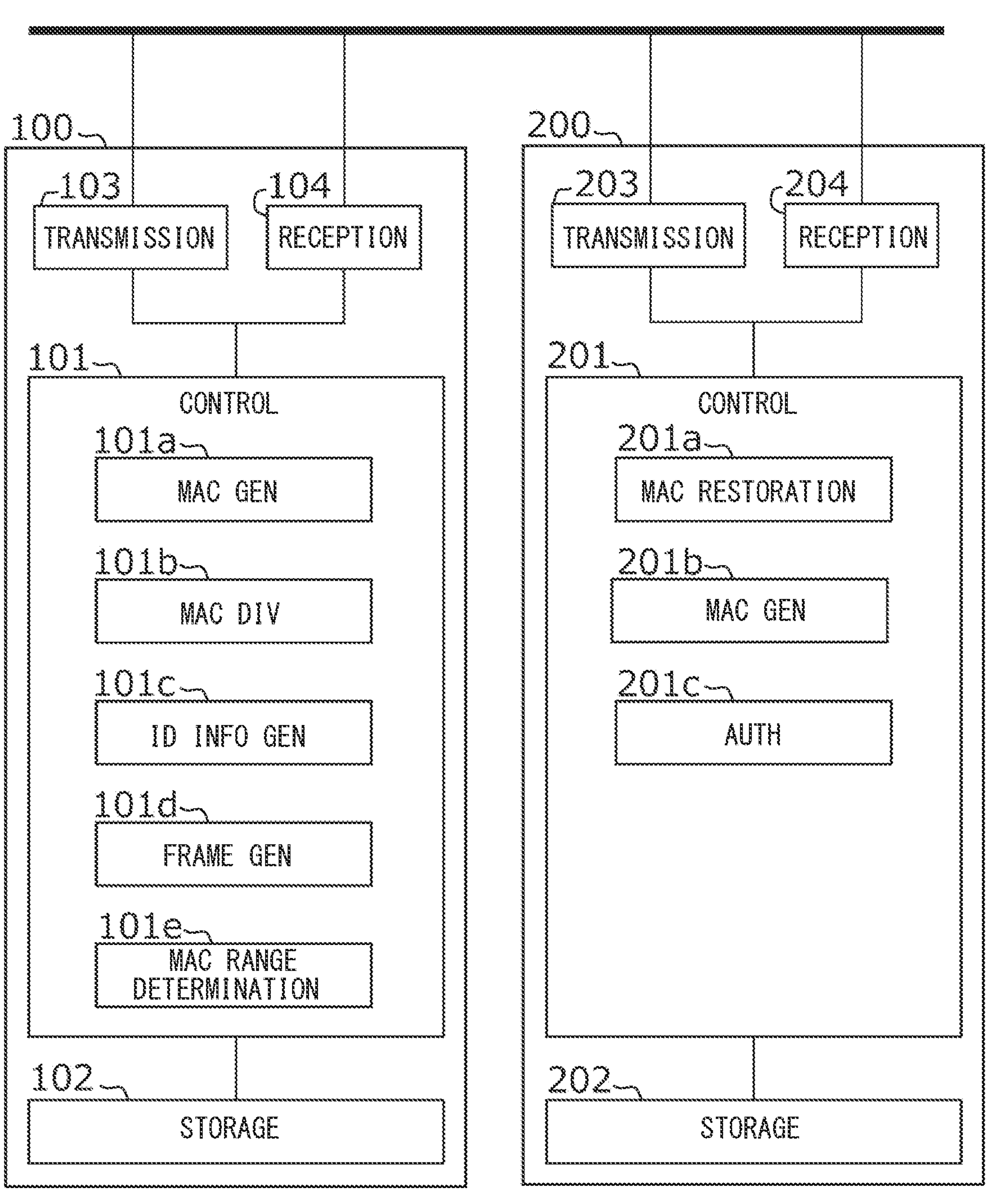
FIG. 13 is a block diagram illustrating an example of configurations of an electronic control system and electronic control units included therein in a second embodiment of the present disclosure.

Referring to FIG. 13, a description will be given of configurations of an electronic control system and individual ECUs included therein in the present embodiment. The control unit 101 of the ECU 100 further includes a MAC range determination unit 101*e* in addition to the MAC generation unit 101*a*, the MAC division unit 101*b*, the identification information generation unit 101*c*, and the frame generation unit 101*d* each included in the configuration in the first embodiment.

The MAC range determination unit 101*e* determines whether or not to transmit all of the plurality of partial MACs on the basis of "a type of the transmission data" or a transmission destination of the transmission data. For example, it is determined whether to transmit the entire frame set including the three frames as illustrated in FIG. 3B or to transmit only the first frame. When any of the partial MACs is to be transmitted, it may be possible to transmit one of the partial MACs or to transmit the plurality of partial MACs.

The "type of the transmission data" mentioned herein may be not only details of information indicated by the transmission data, but also a feature or attribute of the transmission data.

The type of the transmission data can be determined on the basis of, e.g., the CAN ID. As a case where all the plurality of partial MACs are to be transmitted, a case where the transmission data for which high security is to be ensured such as related to a behavior of a moving body (vehicle), such as that for driving control, can be listed. Meanwhile, for the transmission data having a relatively low security priority such as not directly related to driving, only any of the partial MACs in the frame set may also be transmitted.

When the destination of the transmission data does not support, e.g., the restoration of the MAC from the partial MACs, only the first one of the plurality of partial MACs may be transmitted appropriately.

Figures 11A, 11B:
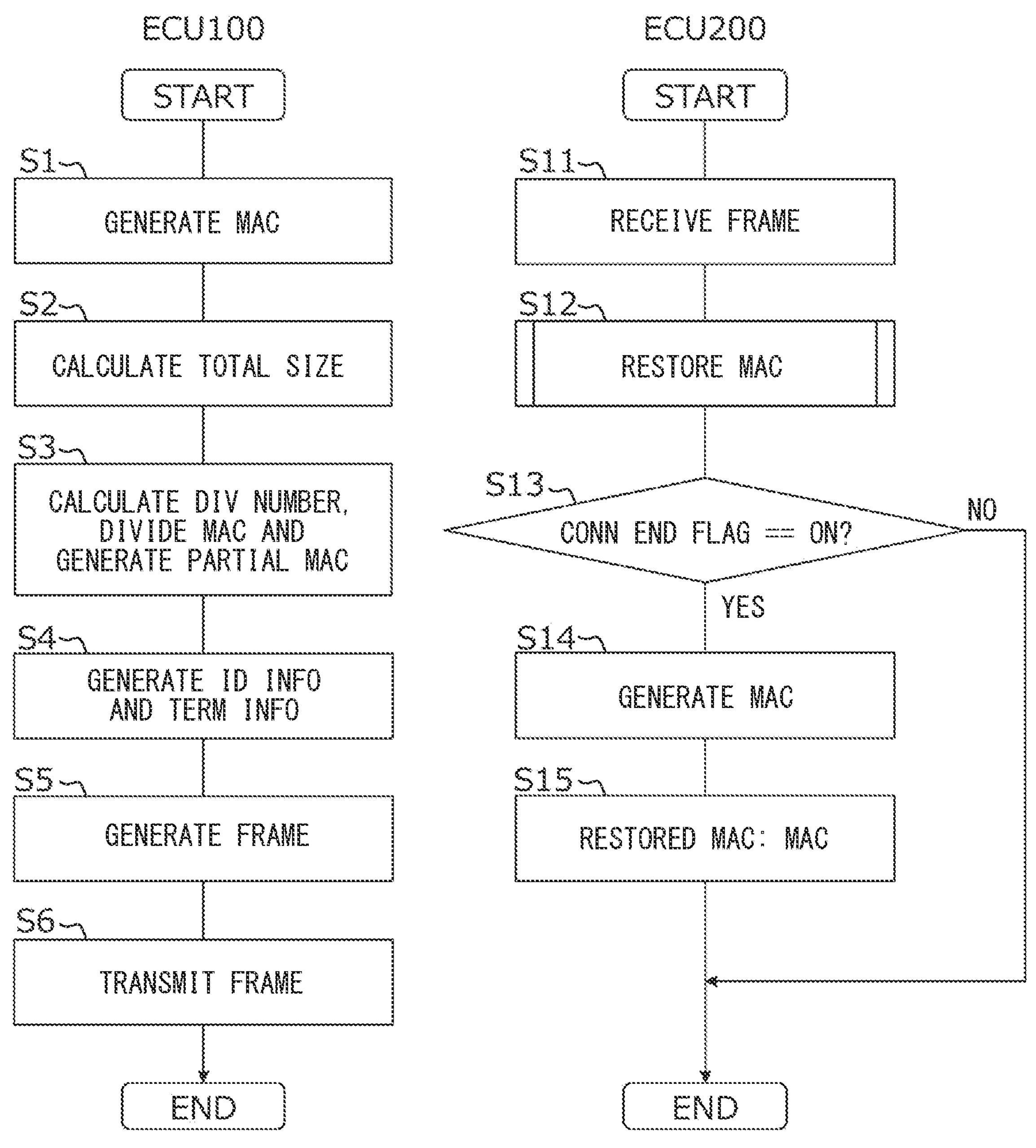
FIG. 11A and FIG. 11B are flow charts illustrating an operation of the electronic control unit in the first embodiment of the present disclosure.
Figure 12:
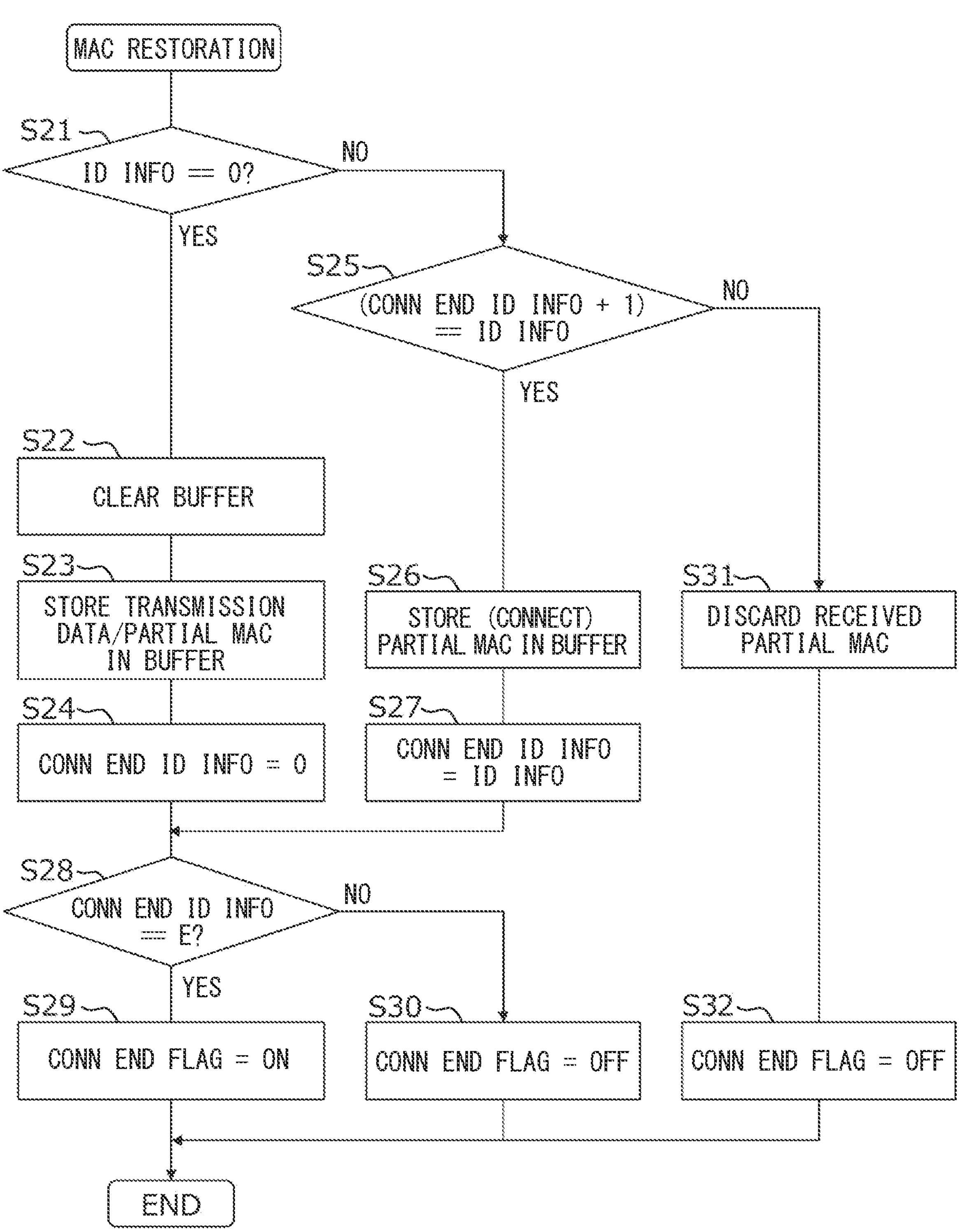
FIG. 12 is a flow chart illustrating a detailed operation of the electronic control unit in the first embodiment of the present disclosure.

The MAC range determination unit 101*e* may appropriately make a determination at any timing up to S6 in FIG. 11A. Then, when the MAC range determination unit 101*e* determines not to transmit all of the plurality of partial MACs, the transmission unit 103 transmits the frame in which the transmission data and at least one of the plurality of partial MACs are stored.

Note that, in the present embodiment, the frame generation unit 101*d* generates the fame set including the plurality of frames and the transmission unit 103 transmits the frame in which at least one of the partial MACs is stored, but the frame generation unit 101*d* may also generate only the frames to be transmitted by the transmission unit 103.

Thus, in the second embodiment, it is possible to select whether or not to transmit all of the plurality of partial MACs on the basis of the type of the transmission data or the transmission destination of the transmission data. As a result, the transmission data for which high security using the large-sized MAC is to be maintained can be transmitted using the frame set including the plurality of frames, while it is possible to reduce processing for transmitting the frames and reduce an amount of communication over the in-vehicle network for the transmission data having a low security priority by limiting the number of the frames to the number of some thereof.

Third Embodiment

In the first embodiment, when the MAC is divided to generate the plurality of partial MACs in the ECU 100, all the partial MACs are transmitted from the transmission unit 103. Then, the ECU 200 that receives these partial MACs uses all of the plurality of received partial MACs to restore the MAC and perform the MAC authentication. In the present embodiment, the ECU 200 determines whether or not to use all of the partial MACs to perform authentication, and performs authentication by using any of the partial MACs when determining not to use all of the partial MACs. The following will describe only parts different from those in the first embodiment and cite the description in the first embodiment for the same parts as those in the first embodiment.

Figure 14:
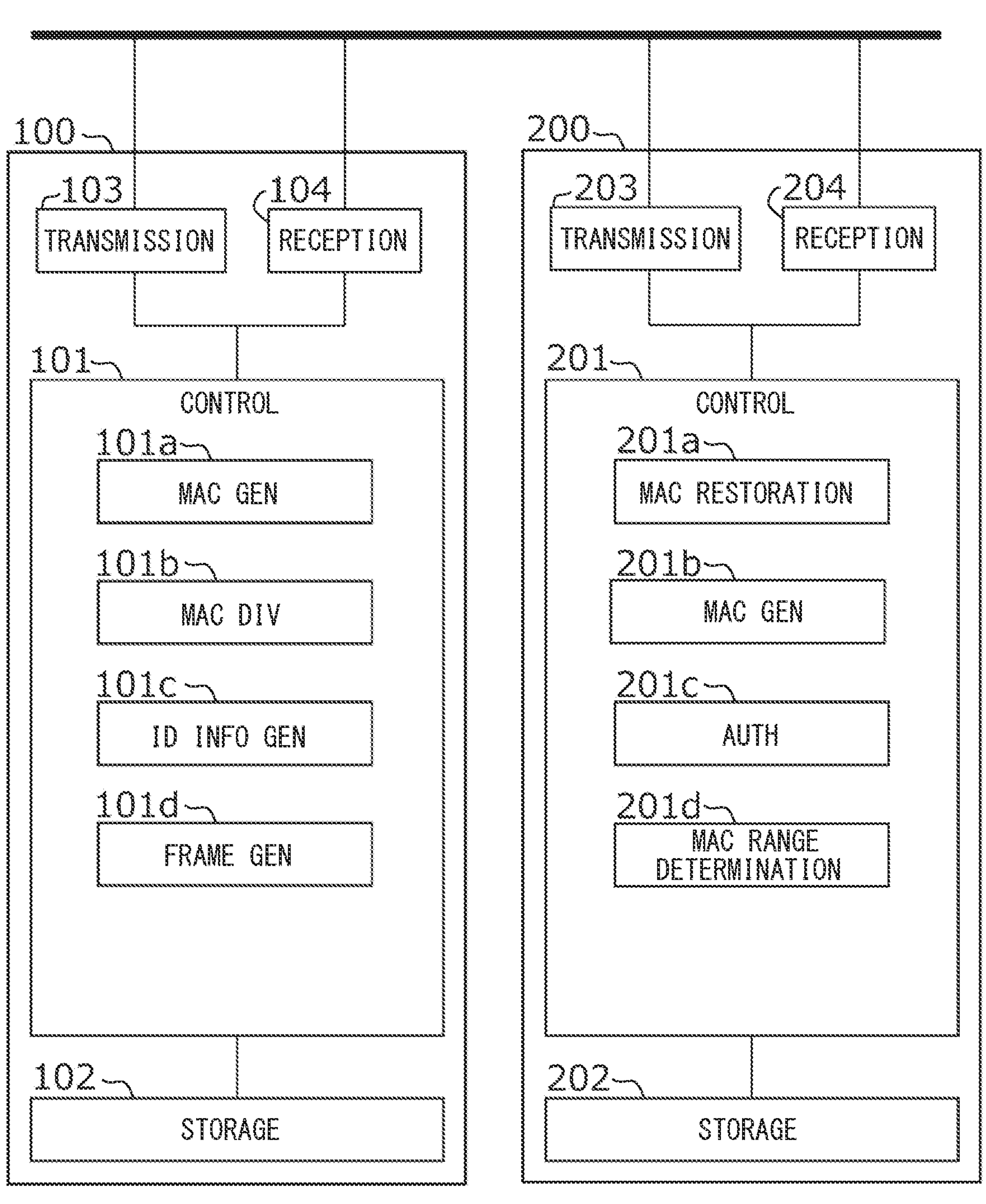
FIG. 14 is a block diagram illustrating an example of configurations of an electronic control system and electronic control units included therein in a third embodiment of the present disclosure.

Referring to FIG. 14, a description will be given of configurations of an electronic control system and individual ECUs included therein in the present embodiment. The control unit 201 of the ECU 200 further includes a MAC range determination unit 201*d* in addition to the MAC restoration unit 201*a*, the MAC generation unit 201*b*, and the authentication unit 201*c* each included in the configuration in the first embodiment.

The MAC range determination unit 201*d* determines whether or not to perform authentication by using all of the partial MACs on the basis of the "type of the transmission data" stored in at least one of the plurality of frames received by the reception unit 204. For example, as in FIG. 3B, the MAC range determination unit 201*d* determines whether to perform authentication by using all of the partial MACs in all of the first to third frames or perform authentication by using only the partial MAC in the first frame on the basis of the transmission data stored in the first frame.

The "type of the transmission data" mentioned herein may be not only details of information indicated by the transmission data, but also a feature or attribute of the transmission data.

Since the CAN ID allows details of the transmission data to be grasped, "on the basis of the type of the transmission data" also includes determining whether or not to perform authentication by using all of the partial MACs on the basis of the CAN ID. As what is to be authenticated using all of the plurality of partial MACs, the transmission data for which high security is to be ensured such as related to the behavior of the moving body (vehicle), such as that for driving control, can be listed. Meanwhile, data having a relatively low security priority, such as the transmission data irrelevant to driving, may also be authenticated using only the partial MAC in any of the frames in the frame set.

Performing authentication using all of the plurality of partial MACs is synonymous to restoring the MAC generated by the ECU 100 by using all of the plurality of partial MACs and performing the authentication by using the restored MAC.

The determination by the MAC range determination unit 201*d* may be performed appropriately, e.g., after S11 in FIG. 11B. When the MAC range determination unit 201*d* has determined not to use all of the partial MACs, the MAC restoration unit 201*a* extracts the partial MAC (corresponding to the "first partial MAC") and the identification information each included in one of the plurality of frames. The MAC generation unit 201*b* generates the partial MAC (corresponding to the "second partial MAC") on the basis of the transmission data and the identification information each stored in at least one of the plurality of frames received by the reception unit 204. The authentication unit 201*c* compares the partial MACs extracted in the MAC restoration unit 201*a* to the partial MACs generated in the MAC generation unit 201*b* to authenticate the transmission data.

Note that, after the transmission data is authenticated through the comparison between the partial MACs extracted in the MAC restoration unit 201*a* and the partial MACs generated in the MAC generation unit 201*b*, the authentication may also be performed again by using the restored MAC generated by connecting all the partial MACs and the MAC generated in the MAC generation unit 201*b*, as performed in the first embodiment.

Thus, in the third embodiment, it is possible to select whether or not to perform the authentication by using all of the partial MACs on the basis of the type of the transmission data stored in at least one of the plurality of received frames. This allows the transmission data for which high security is to be maintained to be authenticated using all of the partial MACs, while allowing the transmission data having the low security priority to be rapidly authenticated using any of the partial MACs.

The foregoing description has been given of the features of the electronic control system and the electronic control units in each of the embodiments of the present disclosure.

The terms used in the above embodiments are examples, the terms may be replaced with synonymous terms or terms including synonymous functions.

In the block diagrams used to describe the embodiments, the configurations of the devices are classified and organized for each function. The blocks representing the respective functions may be implemented by any combination of hardware or software. Since the block diagrams illustrate the functions, the block diagrams also correspond to the method and program that implement the method.

Functional blocks that can be understood as processes, flows, and methods described in the respective embodiments may be changed in order as long as there is no restriction such as a relationship in which results of preceding other processes are used in subsequent process.

The terms such as first, second, to N-th (where N is an integer) used in each embodiment are used to distinguish two or more configurations and methods of the same kind and are not intended to limit the order or superiority.

In the above embodiment, the device described in each embodiment is mounted on the vehicle. Alternatively, the device may be carried by a pedestrian.

Further, examples of the log transmission control apparatus described in the present disclosure include the following. Examples of the form of parts include semiconductor elements, electronic circuits, modules, and microcomputers. Examples of semi-finished products include electronic control units (ECUs) and system boards. Examples of finished products may include a smartphone, a tablet computer, a personal computer (PC), a work station, and a server. Other devices include devices with communication functions, such as, for example, video cameras, still cameras, and car navigation systems.

In addition, necessary functions such as an antenna and a communication interface may be added to the log transmission control apparatus.

The present invention may be implemented by not only dedicated hardware having the configurations and functions described in each embodiment but also as a combination of a program recorded in a storage medium such as a memory or a hard disk and provided to implement the present disclosure, and general-purpose hardware having a dedicated or general-purpose CPU, which can execute the program, and having a memory and the like.

A program may be stored in a non-transitory tangible storage medium including an external storage (for example, hard disk, USB memory, CD/BD), or an internal storage (for example, RAM, ROM) in a special-purpose or general-purpose hardware (for example, computer). Such a program may be downloaded to the storage medium in the hardware via a communication link from a server. Thereby, the latest functions can be provided at all times through program upgrade.

The electronic control device according to the present disclosure has been described mainly as a vehicle use purpose electronic control unit mounted on vehicle. The device may also be applied to general moving bodies such as pedestrians, motorcycles, bicycles with electric motors, railways, ships, and aircrafts.

What is claimed is:

1. An electronic control unit comprising:

at least one of (i) a circuit and (ii) a processor with a memory storing computer program code executable by the processor, the at least one of the circuit and the processor configured to cause the electronic control unit to implement:

a message authentication code (MAC) generation unit that is configured to generate a MAC on a basis of transmission data;

a MAC division unit that is configured to divide a single MAC generated for the transmission data into a plurality of partial MACs, each partial MAC corresponding to a different portion of the single MAC;

an identification information generation unit that is configured to generate individual identification information items which are information items indicating respective portions of the MAC occupied by the individual partial MACs;

a frame generation unit that is configured to store the transmission data in at least one of a plurality of frames and store the individual partial MACs and the individual identification information items corresponding thereto in the plurality of respective frames;

a MAC range determination unit that is configured to select between a case where all of the plurality of partial MACs are transmitted and a case where only a part of the plurality of partial MACs are transmitted, on a basis of a type of the transmission data or a transmission destination of the transmission data, and to determine selection; and a transmission unit that is configured to transmit the plurality of frames.

2. The electronic control unit according to claim 1, wherein the identification information item indicates an absolute position of the partial MAC in the MAC.

3. The electronic control unit according to claim 1, wherein the identification information item indicates an order of the partial MAC starting at a head of the MAC.

4. The electronic control unit according to claim 1, wherein the identification information item stored in the one of the plurality of frames that is last in an order of transmission from the transmission unit serves also as termination information indicating that the order of transmission is last.

5. The electronic control unit according to claim 4, wherein the termination information is a maximum one of values that can be taken by the identification information items.

6. The electronic control unit according to claim 1, wherein the frame generation unit stores termination information indicating that an order of transmission from the transmission unit is last in the one of the plurality of frames that is last in the order of transmission.

7. The electronic control unit according to claim 1, wherein when the frames generated by the frame generation unit are based on a controller area network communication protocol, the identification information items are assigned to data length codes stored in control fields of the frames.

8. The electronic control unit according to claim 7, wherein the identification information items assigned to the data length codes are numerical values in a range of eight to fifteen.

9. The electronic control unit according to claim 1, wherein the identification information items are stored in data fields of the frames.

10. The electronic control unit according to claim 1, wherein when the frames generated by the frame generation unit are based on a controller area network communication protocol, the identification information items are assigned to identifiers stored in arbitration fields of the frames.

11. The electronic control unit according to claim 1, wherein:

when the MAC range determination unit determines not to transmit all of the plurality of partial MACs, the transmission unit transmits the frame storing the transmission data and at least one of the plurality of partial MACs.

12. The electronic control unit according to claim 1, wherein the electronic control unit is mounted on a movable object.

13. The electronic control unit according to claim 1, wherein when the type of the transmission data relates to a behavior of a movable object, all of the plurality of partial MACs are transmitted.

14. The electronic control unit according to claim 1, wherein when the type of the transmission data is not directly related to traveling, a part of the plurality of partial MACs is transmitted.

15. The electronic control unit according to claim 1, wherein when the transmission destination of the transmission data is not capable of reconstructing the MAC from the partial MACs, the partial MAC that is first in order among the plurality of partial MACs is transmitted.

16. A message authentication code (MAC) transmission method to be implemented by an electronic control unit, the MAC transmission method comprising:

generating a MAC on a basis of transmission data;

dividing a single MAC generated for the transmission data into a plurality of partial MACs, each partial MAC corresponding to a different portion of the single MAC;

generating individual identification information items which are information items indicating respective portions of the MAC occupied by the individual partial MACs;

storing the transmission data in at least one of a plurality of frames, while storing the individual partial MACs and the individual identification information items in the plurality of respective frames;

selecting between a case where all of the plurality of partial MACs are transmitted and a case where only a part of the plurality of partial MACs are transmitted, on a basis of a type of the transmission data or a transmission destination of the transmission data, and determining selection; and transmitting the plurality of frames.

17. A non-transitory computer readable storage medium storing a message authentication code (MAC) transmission program executable by an electronic control unit, the MAC transmission program causing the electronic control unit to:

generate the MAC on a basis of transmission data;

divide a single MAC generated for the transmission data into a plurality of partial MACs, each partial MAC corresponding to a different portion of the single MAC;

generate individual identification information items which are information items indicating respective portions of the MAC occupied by the individual partial MACs;

store the transmission data in at least one of a plurality of frames, while storing the individual partial MACs and the individual identification information items in the plurality of respective frames;

select between a case where all of the plurality of partials MACs are transmitted and a case where only a part of the plurality of partial MACs are transmitted, on a basis of a type of the transmission data or a transmission destination of the transmission data, and determine selection; and transmit the plurality of frames.

18. An electronic control system comprising:

a first electronic control unit; and a second electronic control unit;

wherein:

the first electronic control unit includes:

a first message authentication code (MAC) generation unit that generates a first MAC on a basis of transmission data;

a MAC division unit that divides a single MAC generate for the transmission data into a plurality of partial MACs, each partial MAC corresponding to a different portion of the single MAC;

an identification information generation unit that generates individual identification information items which are information items indicating respective portions of the MAC occupied by the individual partial MACs;

a frame generation unit that stores the transmission data in at least one of a plurality of frames, while storing the individual partial MACs and the individual identification information items in the plurality of respective frames;

a MAC range determination unit that selects between a case where all of the plurality of partial MACs are transmitted and a case where only a part of the plurality of partial MACs are transmitted, on a basis of a type of the transmission data or a transmission destination of the transmission data, and determines selection; and a transmission unit that transmits the plurality of frames, and the second electronic control unit includes:

a reception unit that receives the plurality of frames;

a MAC restoration unit that uses the individual partial MACs and the individual identification information items which are stored in the plurality of respective frames to generate a second MAC;

a second MAC generation unit that generates a third MAC on a basis of the transmission data stored in at least one of the plurality of frames received by the reception unit; and an authentication unit that compares the second MAC to the third MAC to authenticate the transmission data.

19. The electronic control system according to claim 18, wherein the second electronic control unit further includes:

a MAC range determination unit that determines, on a basis of a type of the transmission data stored in at least one of the plurality of frames received by the reception unit, whether or not to perform authentication by using all of the individual partial MACs, wherein:

when the MAC range determination unit determines not to use all of the individual partial MACs, the MAC restoration unit extracts the identification information item and a first partial MAC which is the partial MAC included in one of the plurality of frames, the MAC generation unit generates a second partial MAC on a basis of the transmission data and the identification information item each stored in at least one of the plurality of frames received by the reception unit, and the authentication unit compares the first partial MAC to the second partial MAC to authenticate the transmission data.

* * * * *